3,190,904
PROCESS FOR THE PURIFICATION OF ORGANIC PEROXIDES

James Wheater Spoors and Francis Edward Woodward, both of Welwyn Garden City, England, assignors to Imperial Chemical Industries Limited, London, England, a British corporation
No Drawing. Filed Jan. 25, 1962, Ser. No. 168,814
Claims priority, application Great Britain, Feb. 3, 1961, 4,129/61
12 Claims. (Cl. 260—453)

This invention relates to the purification of organic peroxides, more particularly of peresters and acyl peroxides.

Organic acyl peroxides and peresters are used, for example, as catalysts for the polymerization of unsaturated monomers, as intermediates for the production of other chemical compounds, and as bleaching agents. For some purposes, and particularly when they are to be used as polymerization catalysts, the acyl peroxides or peresters are required in highly purified form; otherwise, the impurities present may have undesirable effects, for example those of reducing the efficiency of the catalytic action, of producing odour in the polymer, or of promoting the decomposition of the catalyst during storage.

Peresters and acyl peroxides as prepared are usually impure, containing neutral and acidic impurities; and those that do not crystallise are especially difficult to purify and usually cannot be purified by such techniques as distillation because of their thermal instability. Acyl peroxides and peresters that do crystallise are often preferably handled in solution, because of the shock sensitivity of the solid compounds.

The process of preparation of acyl peroxides or peresters (which are generally soluble in organic solvents but insoluble in water) usually includes the removal of acidic or basic impurities by washing with dilute aqueous reagents such as sodium carbonate solution, aqueous pyridine, and dilute sulphuric acid; neutral impurities, however, remain generally unaffected by such reagents. The use of more strongly alkaline reagents, such as dilute potassium or sodium hydroxides, hydrolyses the neutral impurities but has been found also to hydrolyse the perester or peroxide, resulting in partial or complete destruction.

We have now found that if ammonia is used for washing the impure acyl peroxide or perester, the neutral impurities are hydrolysed and removed with the acidic impurities, but the peroxide surprisingly remains unaffected. It is with this unexpectedly specific action of the ammonia that the present invention is concerned.

In accordance with the present invention, therefore, a process for purifying an organic peroxide selected from the group consisting of peresters and acyl peroxides comprises contacting the organic peroxide with ammonia.

The perester or acyl peroxide is preferably washed with a dilute aqueous solution of ammonia. It may alternatively be contacted with gaseous ammonia, but in such case the treatment is preferably followed by washing with water, since not all the impurities will be precipitated. When the acyl peroxide or perester is a liquid at normal temperatures, it may be treated with the aqueous ammonia, or gaseous ammonia, with or without the addition of organic solvent. When it is a solid, it should be dissolved in a water-immiscible organic solvent.

In the preferred process, the acyl peroxide or perester, or solution thereof, is shaken with aqueous ammonia for a suitable time, depending on the quantity being treated and the nature of the impurities, separated from the ammonia solution, washed with water, and dried. The acyl peroxide or perester may of course be washed more than once, or continuously, with aqueous ammonia if desired.

The acyl peroxides or peresters may have been prepared by any of the methods known to the art. Suitable methods for preparing acyl peroxides include for example:

the reaction of hydrogen peroxide with the appropriate acid chlorides or acid anhydrides, $$H_2O_2 + 2RCOCl \rightarrow R.CO.O.O.CO.R + 2HCl$$

the reaction of a peracid with an acid anhydride or halide, $$R.CO.O.OH + R'.CO.Cl \rightarrow R.CO.O.O.CO.R' + HCl$$

and the air oxidation of a mixture of an aldehyde and an acid anhydride, $$R.CHO + (R'CO)_2O + O_2 \rightarrow R.CO.O.O.CO.R' + R'COOH$$

The last two methods are used more particularly for the production of unsymmetrical peroxides.

Peresters are usually prepared by the acylation of a hydroperoxide using an acyl halide or a ketene.

Impurities likely to be contained in the acyl peroxides produced by any of the above methods include acyl compounds, for example carboxylic acids, acid chlorides, peracids and esters. In the peresters, carboxylic acids, acid chlorides, esters and hydroperoxides may be expected as impurities.

Our invention is illustrated but in no way limited by the following examples in which all parts given are by weight unless otherwise stated.

Example 1

An amount of 9.2 g. of 73.5% pure propionyl 3,5,5-trimethylhexanoyl peroxide (which had in the course of preparation been purified by washing successively with dilute sulphuric acid, sodium carbonate solution, sodium bisulphite solution and water) was shaken with aqueous ammonia (2.5 ml. 0.880 ammonia in 25 ml. water) for 5 mins., separated, washed with water (2 x 20 ml.) and dried over anhydrous sodium sulphate. 7.15 g. of 93.6% pure propionyl 3,5,5-trimethylhexanoyl peroxide were obtained.

Example 2

An amount of 9.5 g. of 81.1% pure acetyl 3,5,5-trimethylhexanoyl peroxide (which had in its preparation been purified as described for the peroxide used in Example 1) was washed with aqueous ammonia and subsequently treated as described in Example 1. It gave 8.1 g. of 92.0% pure material.

Example 3

An amount of 9.8 g. of 93.6% pure bis-3,5,5-trimethylhexanoyl peroxide (which had previously been washed with water, aqueous pyridine, water, dilute sulphuric acid, and water) was washed with aqueous ammonia and subsequently treated as described in Example 1; it gave 8.8 g. of 99.5% pure material.

Example 4

An amount of 20 ml. of a solution of commercially available t-butyl perbenzoate 41.5% w./v. in medicinal paraffin oil was washed with aqueous ammonia and subsequently treated as described in Example 1. It gave 17 ml. of a 47.5% w./v. solution of peroxide.

Example 5

An amount of 100 g. of a solution of t-butyl per-2-ethyl hexanoate 38.0% w./w. in white spirit (which had previously been washed with dilute sodium chloride solution and with water) was washed with aqueous ammonia and subsequently treated as described in Example 1. It gave 73 g. of a 50.2% w./w. solution of the peroxide.

Example 6

An amount of 20 g. of a solution of water-washed t-butyl perpivalate, 30.7% w./w. in white spirit, was washed with aqueous ammonia and subsequently treated as described in Example 1. It gave 19.0 g. of a 32.2% w./w. solution of the peroxide.

*Example 7*

An amount of 15 ml. of a solution of commercially available octanoyl peroxide 17.4% w./v. in medicinal paraffin oil was washed with aqueous ammonia and subsequently treated as described in Example 1; it gave 13.4 ml. of an 18.3% w./v. solution of the peroxide.

*Example 8*

An amount of 20 ml. of a solution of commercially available decanoyl peroxide 10.3% w./v. in 100–120 petroleum ether was washed with aqueous ammonia and subsequently treated as described in Example 1; it gave 19.0 ml. of a 10.8% w./v. solution of the peroxide.

*Example 9*

An amount of 220 ml. of a solution of commercially available p-chlorobenzoyl peroxide 41.5% w./v. in medicinal paraffin oil was washed with aqueous ammonia and subsequently treated as described in Example 1; it gave 17.0 ml. of a 47.5% w./v. solution of the peroxide.

*Example 10*

For purposes of comparison, an amount of 10.95 g. of 95.3% pure bis 3,5,5-trimethylhexanoyl peroxide was shaken with dilute sodium hydroxide solution (20 ml. of 10% w./v. solution) for 5 minutes. It was then separated, washed with water (2 x 20 ml.) and dried over anhydrous sodium sulphate. 10.05 g. of 94.7% pure bis 3,5,5-trimethylhexanoyl peroxide remained, indicating that some decomposition of the peroxide had occurred, and decomposition products had not been removed by the sodium hydroxide solution and water.

We claim:

1. A process for purifying an organic peroxide containing a neutral ester as impurity, which comprises washing said peroxide with an aqueous solution of ammonia sufficient to hydrolyze said neutral ester without affecting said peroxide, said peroxide being selected from the group consisting of lower alkyl peresters of saturated aliphatic monocarboxylic acids and benzoic acid, and peroxides having the formula:

$$R\overset{O}{\underset{\|}{C}}-O-O\overset{O}{\underset{\|}{C}}R'$$

where R and R' are selected from the group consisting of alkyl up to 9 carbon atoms and chlorophenyl.

2. The process of claim 1 wherein said peroxide is washed with said aqueous ammonia solution to hydrolyze said ester, the solution containing the hydrolyzed ester is separated and said peroxide is then washed with water and dried.

3. A process as claimed in claim 1 in which the organic peroxide is dissolved in an inert water-immiscible hydrocarbon solvent to form a solution which is contacted with said ammonia solution.

4. A process as claimed in claim 1 in which the organic peroxide is propionyl 3,5,5-trimethylhexanoyl peroxide.

5. A process as claimed in claim 1 in which the organic peroxide is acetyl 3,5,5-trimethylhexanoyl peroxide.

6. A process as claimed in claim 1 in which the organic peroxide is bis-3,5,5-trimethylhexanoyl peroxide.

7. A process as claimed in claim 1 in which the organic peroxide is t-butyl perbenzoate.

8. A process as claimed in claim 1 in which the organic peroxide is t-butyl per-2-ethyl-hexanoate.

9. A process as claimed in claim 1 in which the organic peroxide is t-buty perpivalate.

10. A process as claimed in claim 1 in which the organic peroxide is octanoyl peroxide.

11. A process as claimed in claim 1 in which the organic peroxide is decanoyl peroxide.

12. A process as claimed in claim 1 in which the organic peroxide is p-chlorobenzoyl peroxide.

References Cited by the Examiner
UNITED STATES PATENTS

| | | | |
|---|---|---|---|
| 2,567,615 | 9/51 | Milas | 260—453 |
| 3,003,000 | 10/61 | Milas | 260—453 |

CHARLES B. PARKER, *Primary Examiner.*

IRVING MARCUS, *Examiner.*